United States Patent Office 3,520,972
Patented July 21, 1970

3,520,972
FELINE VIRUS VACCINES OBTAINED BY PROPAGATION AND SERIAL PASSAGE ATTENUATION OF VIRULENT FELINE VIRUSES IN DIPLOID FELINE EMBRYO TISSUE CELL SERIAL PASSAGE SUBCULTURE STRAINS
Sidney Edwin Smith, Kevin Joseph O'Reilly, and John Prydie, London, England, assignors to Burroughs Wellcome & Co. (U.S.A.) Inc., Tuckahoe, N.Y., a corporation of New York
No Drawing. Filed Feb. 14, 1967, Ser. No. 615,922
Claims priority, application Great Britain, Feb. 18, 1966, 7,258/66; Sept. 8, 1966, 40,225/66
Int. Cl. C12k 1/06, 7/00, 9/00
U.S. Cl. 424—89                                6 Claims

ABSTRACT OF THE DISCLOSURE

A method for producing a non-contaminated attenuated strains until the virus loses its infectivity but still retains virulent strain of the virus in cultures of embryonic cell strains until the virus loses its infectivity but still retains its immunogenicity.

This invention relates to cell strains, particularly to a novel type which is derived from feline embryo cells, to the growth of viruses thereon, and to vaccines containing such viruses.

It has been known to grow the feline infectious enteritis (panleucopoenia) virus on a primary tissue culture prepared by trypsinizing infected cat kidney cells. This method, has however, suffered from the disadvantage that the possibility of contamination with other, not easily detectable viruses could not be excluded, whilst the available quantity of such a tissue culture is limited at certain times of the year, and represents a heterogenous population of cells, which hinders the production of the virus for the purposes of experimentation or preparation of vaccines. Furthermore, modification and attenuation of the feline infectious enteritis virus in primary kitten kidney culture is impracticable because of the danger of contamination with virulent feline infectious enteritis virus which may at times be present in the primary kitten tissue cultures used.

It has generally been recognised that the lack of suitable contamination free host cells or cell strains capable of supporting pathogen viruses of interest greatly hindered research and development efforts to provide viruses suitable for use in vaccines to combat animal and human diseases.

A new cell strain comprising cells which are derived from the feline embryo lung and has now been found to be capable of supporting pathogenic viruses, particularly the feline infectious enteritis virus, feline rhinotracheitis virus and feline picornaviruses. It has also been found that cell strains derived from feline embryo kidney or heart, or the mixture thereof, or from embryo skin, muscle, amnion (placenta), tongue, liver or gut, or the whole embryo or embryo carcase, are likewise suitable for supporting pathogenic viruses. Furthermore, it has become possible to attenuate for instance the feline infectious enteritis virus by means of passaging the virus in cultures of such feline embryonic cell strains.

According to the present invention in the first aspect there is provided a cell strain, comprising cells which are derived from feline embryos and are capable of supporting pathogenic viruses. In a second aspect there is provided a method for producing a cell strain as hereinbefore defined, in which the appropriate feline embryo tissue is disaggregated and then cultured or subcultured by serial passages in a nutrient medium.

In a third aspect there is provided a method for growing a virus, wherein a culture of the cell strain, as hereinbefore defined, is infected with a virus to which the strain is susceptible, and the strain is then cultured in a nutrient medium. In a fourth aspect there is provided an antigenic material, which is obtained from a virus grown on that cell strain, and a vaccine presenting the antigenic material in an administrable form and dosage.

In a particular aspect an attenuated strain of the feline infectious enteritis virus is provided by a method which comprises passaging a virulent strain of the virus in cultures of feline embryonic cell strains, as hereinbefore defined, until the virus loses its infectivity, but still retains its immunogenicity. The strains so obtained can be presented in the form of a vaccine for the immunisation of cats against feline infectious enteritis.

It is well-known that cell strains are cell systems which are derived from cells removed from living organisms and are capable of being cultured in vitro in a nutrient medium while remaining substantially diploid with the chromosomal composition unchanged. For the purposes of the present invention any medium known in the art, which provides the necessary physical and chemical conditions and nutritional composition for culturing or subculturing, i.e. the maintenance, individual growth and multiplication of these cells, may be used. It has, however, been preferred to use Eagle's Basal Medium with some bovine serum, and particularly the same medium with tryptose phosphate broth and with twice the usual amount of amino acids and vitamins. The pH of the medium is kept between pH 6.8 and 7.8 for instance by the use of a buffering agent.

Cell strains according to the present invention provide host cells for growing viruses. These cells are free from viral contamination and represent a substantially constant degree of viral susceptibility. They can be made available in practically any quantity independently of the seasonal fluctuations experienced with primary tissue cultures directly obtained from young kittens.

The cat embryo used for the purposes of the present invention may preferably be of the size from about 1 cm. to 4.5 cm. The embryo or part of it is removed under aseptic conditions and disaggregated mechanically or with a suitable enzyme preparation in a buffered saline solution. The resulting cell suspension is then transferred into the containers holding the nutrient medium and is cultured within the temperature range of 32° C. to 39° C., preferably within 35° C. to 37.5° C. To facilitate subculturing it is customary to treat the confluent sheets of the cells of the strain with trypsin and an innocuous chelating agent before each transfer into new medium.

The lung tissue may conveniently be removed from a cat embryo at about 5 to 7 weeks gestation under sterile conditions and disaggregated mechanically or with a suitable enzyme preparation in a buffered saline solution. The resulting cell suspension is then transferred into the containers holding the nutrient medium and is cultured within the temperature range of 32° C. to 39° C., preferably within 35° C. to 37.5° C. To facilitate subculturing it is customary to treat the confluent sheets of the cells of the strain with trypsin and an innocuous chelating agent before each transfer into new medium.

It has been observed that the cells of the strain multiply at a rate which represents a doubling of their number every 2 to 3 days. The cell strain according to the present invention is capable of supporting a number of viruses to which they are susceptible in this respect. Examples for such virus are the feline infectious enteritis virus, feline rhinotracheitis virus, feline picornaviruses and the bovine herpes virus. The picornaviruses include those feline viruses which have properties resembling enteroviruses, rhinoviruses, and also other viruses with properties intermediate between enteroviruses and rhinoviruses.

In order to infect the cell strain with the virus, the strain may be mixed with a saline suspension of the virus, for instance obtained from the exudate of an infected animal or from other sources. In the case of the feline infectious enteritis virus, it has been preferred to use feline infectious enteritis infected spleen or small intestine of cats, and innoculate the same into cultures of the feline embryonic cell strain.

The virus usually produces recognisable changes or cellular degeneration in the strain. When the virus is present in a sufficient quantity, the culture is tested for immunogenic potency and toxicity. If necessary, the virus is attenuated or further attenuated by serial passages in the cell strains provided by the present invention, or is inactivated by the use of suitable chemical or physical agents. The antigenic material so obtained is either used to produce antibodies for passive immunisation or is used as a vaccine by administering the same into warm blooded susceptible animals.

The following examples illustrate the invention.

EXAMPLE 1

Lung tissue was removed from 2 cat embryos at about 6 weeks gestation. The tissue was disaggregated with a 0.25% solution of trypsin (Nutritional Biochemicals Co. 1/300) in a phosphate buffered saline solution described by Dulbecco et al., J. exp. Med., 1954, 99, 167. The resulting suspension was seeded at $5 \times 10^6$ cells to a 4 oz. (112 ml.)-medical flat bottle, which contained Eagle's Basal Medium (80 parts by volume) (cf. Eagle H., Science, 1955, 122, 504), modified to have twice the usual amount of amino acids and vitamins, tryptose phosphate broth (10 parts by volume) and bovine serum (10 parts by volume) as a sterile solution.

The monolayer cultures so formed were subcultured by serially passaging the content of one flask into 2 or 3 flasks on average twice weekly. The cells were resuspended for this purpose with a 0.05% solution of sodium edetate in a 0.1% solution of trypsin in the above type of phosphate buffered saline.

It was observed that the cells were typical fibroblasts and remained substantially diploid up to the 40th passage. No morphological transformations occurred up to this passage level, although chromosome abnormalities became increasingly common beyond that stage.

Stocks of cells up to the 20th passage level were maintained at $-190°$ C. in a growth medium with 10% dimethyl sulphoxide added.

In another, similar experiment a medium containing Eagle's Basal Medium (90 parts by volume) and bovine serum (10 parts by volume) was used, but the cells did not grow so rapidly.

EXAMPLE 2

Embryos (size about 2.5 cm.) were removed from pregnant cats and were chopped into fine fragments. The tissue was disaggregated with a 0.25% solution of trypsin (Nutritional Biochemicals Co. 1/300) in a phosphate buffered saline solution. The resulting suspension was seeded at $5 \times 10^6$ cells to a 4 oz. (112 ml.)-medical flat bottle, which contained Eagle's Basal Medium (80 parts by volume) modified to have twice the usual amount of amino acids and vitamins, tryptose phosphate broth (10 parts by volume) and bovine serum (10 parts by volume) as a sterile solution.

The monolayer cultures so formed were subcultured by serially passaging the content of one flask into 2 or 3 flasks, on average twice weekly, later once a week. The cells were resuspended for this purpose with a 0.05% solution of sodium edetate in a 0.1% solution of trypsin in the above type of phosphate buffered saline.

It was observed that the cells were typical fibroblasts and remained substantially diploid up to the 48th passage.

Stocks of cells up to the 20th passage level were maintained at $-190°$ C. in a growth medium with 10% dimethyl sulphoxide added.

Similar experiments were carried out with cat embryos varying in size from about 1 cm. to 4.5 cm., with embryo carcase and with the following parts of the cat embryo; kidney, heart, heart and lung mixture, skin, muscle, gut, amnion (placenta), tongue and liver. Satisfactory cell strains were obtained from all these tissues.

EXAMPLE 3

Confluent sheets of the cell strain were obtained and treated with sodium edetate, as described in Examples 1 or 2, and the cells dispensed into test tubes (150 x 50 mm.) containing cover slips (No. 1. 22 x 10). To each test tube, about $2.0 \times 10^5$ cells in 2 ml. medium were added, and the tubes were incubated at $37°$ C. while inclined at an angle of about $10°$.

A confluent sheet of cells was formed on cover slips 24 to 48 hours after seeding. The medium contained 77.5% of Eagle's Basal Medium modified as defined in Example 1, bovine serum (10%), tryptose phosphate broth (10%) and a 4.4% sodium hydrogen carbonate solution (2.5%).

An appropriate dilution (0.25 ml.) of the feline infectious enteritis virus was added to the cells present in the above media. The test tubes were incubated at an angle of about $10°$ at a temperature of $37°$ C.

The virus produced recognisable changes in the nucleus when the cells were stained with haematoxylin and eosin. At about 18 hours after infection, the infected nuclei (about 1–2% of all the nuclei) took up more haematoxylin than the non-infected nuclei. This was followed in the next 6 hours by enlargement of the nucleoli, homogenous darkening of the other nuclear contents and the development of a clear zone surrounding the nucleolus or nucleoli, if more than one present, and another clear zone immediately inside the nuclear membrane. During the next 24 hours the infected cells appeared to shrink and stain almost black before finally detaching from the coverslip. About 5 to 10% of all nuclei showed the above changes during the first two days following infection.

Similar experiments were carried out with all the other cell strains obtained according to the last paragraph of Example 1. The virus grew satisfactorily on all these new strains.

EXAMPLE 4

Confluent sheets of cells obtained from whole embryos were prepared in test tubes as described in Example 2. A sample of nasal or ocular exudate of a cat suffering from feline rhinotracheitis was mixed with the phosphate-buffered saline solution (2.0 ml.), referred to in Example 1, containing also 200 units of penicillin and 100 mg. of streptomycin per mililitre.

The nutrient medium was removed from the cell strain monolayer in five separate tubes, replaced with the exudate-buffer mixture and incubated at $37°$ C. for 2 hours. The exudate buffer mixture was then removed and the cells washed with fresh sterile buffer solution. The infected tubes containing fresh nutrient medium (1.5 ml. per tube) were then incubated at $37°$ C. in fresh nutrient medium (1.5 ml.).

Daily microscopic examination of the infected cultures and control cultures, prepared with sterile saline solution instead of the exudate-buffer mixture, followed.

During the next few days the microscopic appearance of the cells in the control tubes remained normal. In the infected tubes, areas of abnormal cells appeared within 48 hours. These areas were discretely scattered throughout the cell sheet and consisted of rounded cells showing increased refractility. The areas of affected cells were clearly demarcated from the surrounding cells of normal appearance in the early stages. As infection progressed the areas of abnormal cells became larger and more numerous until the entire cell sheet was involved by the 4th to 6th day. In the later stages of infection, some cells detached from the glass leaving clear spaces in the cell sheet. To the naked-eye, the cell sheet took on a "cloudy" appearance. Various tests applied to the fluid and/or cells from infected tubes demonstrated that the agent responsible for these cellular changes was a virus, and still further tests established the identity of the virus as feline rhinottracheitis virus. Other tests demonstrated that the infected cultures were free of other micro-organisms. The virus could be transmitted serially to fresh tube cultures of the same sell strain in which similar cellular degenerative changes took place. Suitable dilution experiments further demonstrated that multiplication of the virus had taken place.

EXAMPLE 5

A further experiment was carired out according to the method described in Example 3 but using a cell strain obtained from the embryonic lung. It was found that this virus also grows well on such cell strains, and results similar to those described in Example 4 were attained.

EXAMPLE 6

Confluent sheets of the cell strain were obtained in test tubes as described in Example 1. A sample of nasal or occular exudate of a cat suffering from "feline influenza," providing thereby a source of feline picornavirus, was mixed with the phosphate-buffered saline solution (2.0 ml.), referred to in Example 1, containing also 200 units of penicillin and 100 μg. of streptomycin per millilitre.

The nutrient medium was removed from the cell strain monolayer, and was replaced with the exudate-buffer mixture and incubated at 37° C. for 2 hours. The exudate buffer mixture was then removed and the cells washed with fresh sterile buffer solution. The infected cell strain was then incubated at 37° C. in a fresh nutrient medium (1.5 ml.).

Daily microscopic examination of the infected culture and a control culture, prepared with sterile saline solution instead of the exudate-buffer mixture, followed. It was found that the cellular degeneration (cythopatic effect) which appeared after 2 to 7 days of incubation, was not unlike that produced by human picornaviruses, for example the poliomyelitis virus. The virus could be transferred by serial passages in cultures of the cell strain, and suitable dilution experiments demonstrated that multiplication of the virus in the cell strain had taken place. Further tests demonstrated that the cultures so obtained by serial passages were free of contaminating other microorganisms.

EXAMPLE 7

The virus of feline infectious enteritis was recovered from both the spleen and small intestine taken from infected cats at the height of the disease, and inoculated into cultures of a feline embryonic lung cell strain. To test for intranuclear changes, the cultures were stained with haematoxylin and eosin. When changes were clearly evident—three to five days after infection of the cultures—the infected cultures were stored frozen at −30° C.

The virus stored frozen at −30° C. was later thawed and passaged in non-infected cultures of feline embryonic cell strains. At the appropriate time, as judged by the presence of intranuclear changes, the infected cultures of cell strains were again stored frozen at −30° C. until the next passage.

When passaging the virus in feline embryonic cell strains, it was customary to add the virus simultaneously with the cells and growth media to the culture vessel. The culture of embryonic cell strains containing the virus inoculum was incubated at 37° C.

The virus strain, for which attenuation for cats is claimed, was serially passaged as described above eight times in feline embryonic lung cell strains and then five times in strains obtained from the whole feline embryo. An aliquot was passaged twice more in strains obtained from the whole feline embryo. Another sample, however, was passaged once in a feline whole-embryo cell strain followed by two or three passages in feline embryonic lung cell strains.

The eighth passage of the attenuated strain of feline infectious enteritis virus was tested for innocuity in two 4-month old kittens. Each kitten was injected subcutaneously with 1.0 ml. of virus infected tissue culture fluid and cells, which was equivalent to 200 tissue culture infective doses. Neither kitten showed any clinical illness although the total count of circulating leucocytes was depressed from the third to the ninth days. Rectal swabs were obtained daily from the kittens from the second to the ninth days after inoculation. Tissue cultures inoculated with these swabs did not show any evidence of virus.

On the twenty-first day these two kittens, together with two uninoculated control kittens of similar age, were challenged orally with 1.0 ml. of a 10% suspension of liver and spleen in 10% horse serum broth. The liver and spleen were obtained from a typical fatal case of feline infectious enteritis. The inoculated cats remained clinically normal throughout the challenge period. The uninoculated control cats, however, became pyrexic on the fifth day after challenge, lost body condition, were dull and were significantly leucopoenic.

GEOMETRIC MEAN LEUCOCYTE COUNTS ($\times 10^3$)

| Days | 1 | 2 | 3 | 4 | 5 | 6 | 7 | 8 | 9 | 10 |
|---|---|---|---|---|---|---|---|---|---|---|
| After inoculation | 8.8 | 11.2 | 9.7 | 6.8 | 4.5 | 6.0 | 6.1 | 5.8 | 6.7 | 10.1 |
| After challenge: | | | | | | | | | | |
| Inoculated kittens | 19.3 | 10.1 | 10.7 | 9.3 | 8.2 | 8.4 | 12.3 | 8.4 | 12.1 | |
| Uninoculated kittens | 10.6 | 11.7 | 4.9 | 6.6 | 4.6 | 3.8 | 4.3 | 5.3 | 6.5 | |

The kittens were bled before inoculation and before and after challenge and the serum examined for neutralising antibody.

SERUM NEUTRALIZING ANTIBODY

| Kitten number | Pre-inoculation | Pre-challenge | Post-challenge |
|---|---|---|---|
| Inoculated: | | | |
| 233 | [1] <2 | 640 | 640 |
| 234 | <2 | 640 | 2,560 |
| Uninoculated: | | | |
| 235 | [2] NT | 2 | 640 |
| 236 | NT | 2 | 640 |

[1] Reciprocal of serum dilution.
[2] Not tested.

The fifteenth passage of this attenuated strain of feline infectious enteritis virus was tested in kittens for innocuity and antigenicity, and for infectivity for uninoculated in-contact kittens. Virus was grown in the feline embryo cell strain and kittens were inoculated subcutaneously with 1.0 ml. of vaccine. The experiment was carried out in two parts, A and B.

(A) First, one 4 month old kitten was vaccinated with $1.6 \times 10^5$ tissue culture infective doses of virus. The kitten remained healthy and there was no evidence of leucopoenia or pyrexia and no virus was recovered from the faeces during the first fifteen days of the experiment. Two 4-month old kittens and four 3-month old kittens were kept in contact with the vaccinated kittens. None of these kittens shownied any sign of ill health, leucopoenia or pyrexia.

(B) In the second part of the experiment, six 6–7-month old cats were vaccinated with $1.6 \times 10^3$ tissue culture infective doses of virus. These cats also remained healthy.

The animals used in the above experiments were bled immediately before vaccination and three weeks later. The sera were examined for neutralising antibody.

SERUM NEUTRALISING ANTIBODY

| Cat number | Pre-vaccination | Three weeks post-vaccination |
|---|---|---|
| A. Inoculated: 238 | <10 | 1,000 |
| Non-inoculated In-contact: | | |
| 237 | <10 | <5 |
| 239 | <10 | <5 |
| 240 | <10 | <5 |
| 241 | <10 | <5 |
| 243 | <10 | <5 |
| 244 | <10 | <5 |
| B. Inoculated: | | |
| 223 | <5 | 100 |
| 224 | <5 | 1,000 |
| 225 | <5 | 1,000 |
| 266 | <5 | 1,000 |
| 226 | <5 | 1,000 |
| 228 | <5 | 1,000 |
| 229 | <5 | 1,000 |
| 230 | <5 | 10,000 |

In another experiment three kittens aged three months were vaccinated subcutaneously with 1.0 ml. of virus at the eighteenth passage level and propagated in a feline embryonic lung cell strain. This amount of virus is equivalent to $1.6 \times 10^5$ tissue culture infective doses. These kittens, together with two uninoculated in-contact kittens of the same age, remained healthy and showed no evidence of leucopoenia or pyrexia.

Serum samples were obtained from the vaccinated kittens immediately before inoculation and eleven and twenty-two days later. The uninoculated in-contact kittens were bled at the same time. All the sera were examined for neutralising antibody.

| | Pre-vaccination | Post-vaccination (days) | |
|---|---|---|---|
| | | 11 | 22 |
| Vaccinated Kittens: | | | |
| 247 | <10 | 100 | >10,000 |
| 250 | <10 | 10,000 | >10,000 |
| 252 | <10 | >10,000 | >10,000 |
| Uninoculated In-contact Kittens: | | | |
| 251 | <10 | 10 | <10 |
| 254 | <10 | 10 | <10 |

It has been concluded that this strain of feline infectious enteritis (panleucopenia) virus, grown and passaged in feline embryonic cell strains, is antigenic, stimulates in cats the production of homologous neutralising antibodies, and is not spread from vaccinated kittens to in-contact susceptible kittens.

EXAMPLE 8

Roux bottles, each containing 12 to $15 \times 10^6$ cells in 100 ml. growth media, as described in Example 7, were incubated at 37° C. for 24 hours. The confluent cell sheets were washed once with phosphate buffered saline solution pre-warmed to 37° C., and were inoculated with 10 ml. of an undiluted feline infectious enteritis virus suspension, which was obtained from the 15 to 18th tissue culture passage stage described in Example 7 and represented $1.6 \times 10^6$ tissue culture infective doses (TCID) of the virus.

10 ml. of the medium S.M. 199 (cf. Morgan et al., Proc. Soc. Exp. Biol. Med., 1950, 73, at p. 6), containing also 0.5 ml. of a 4.5% solution of sodium hydrogen carbonate with the usual amounts of penicillin and streptomycin, was added to the culture, and the mixture was incubated at 37° C. for 72 hours.

The culture was then rapidly frozen and thawed three times, and was used and tested as described in Example 7. Satisfactory results were obtained.

When necessary, the freeze-thawed preparation was again freezed, and stored at $-65°$ C.

What we claim is:

1. Method of attenuating a feline virus, which comprises the steps of
    (a) deriving a feline embryonic cell strain by a process in which feline embryo tissue cells are disaggregated and serially passaged so as to be cultured and subcultured in a suitable nutrient medium, wherein said subculturing may be facilitated by treating the confluent sheet of the cells with a chelating agent before each transfer into a new nutrient media, and wherein said subculturing may be repeated while the cell strains remain substantially diploid, typically fibroblastic and free from morphological transformations although there may be some chromosome abnormalities and tests indicate the diploid cell strain cultures so obtained are free from contaminating micro-organisms,
    (b) inoculating said substantially diploid feline cell strain cultures with a virulent strain of a feline virus selected from the class consisting of feline infectious enteritis virus, feline rhinotracheitis virus and feline picornavirus, and
    (c) serially passaging such directly infected cultures at least until the serially passaged virus loses its infectivity but still retains its immunogenicity.

2. The method of claim 1, wherein the feline embryonic cell strains are derived from the lung, kidney, heart, skin, muscle, amnion (placenta), tongue, liver, gut of the embryo or the entire embryo.

3. The method of claim 1, wherein the nutrient medium contains an ingredient selected from the group consisting of Eagle's Basal medium, bovine serum, and tryptose phosphate broth.

4. The method of claim 1, in which the nutrient medium contains Eagle's Basal medium and bovine serum and has a pH in the range of about 6.8 to 7.8.

5. The method of claim 4, in which the nutrient medium also contains tryptose phosphate broth with twice the usual amount of amino acids and vitamins.

6. A vaccine containing an attenuated strain of the feline infectious enteritis virus obtained by the method claimed in claim 1, in an administrable dosage.

References Cited

UNITED STATES PATENTS

| 3,293,130 | 12/1966 | Slater et al. | 195—1.3 |
| 3,423,505 | 1/1969 | Crawley et al. | 195—1.3 |
| 3,450,598 | 6/1969 | Welsh et al. | 195—1.8 |
| 3,462,526 | 8/1969 | de Ratuld et al. | 424—90 |

OTHER REFERENCES

Stewart et al.: Science 148 (3675): 1341–1343, June 4, 1965.

Spertzel et al.: P.S.E.B.M. 120(3): 651–655, December 1965.

Crandell et al.: P.S.E.B.M. 106(3), 542–545 (1961), "Susceptibility of Primary Cultures of Feline Renal Cells to Selected Viruses."

SHEP K. ROSE, Primary Examiner

U.S. Cl. X.R.

195—1.1, 1.3, 1.5, 1.8; 424—8, 12, 86

PO-1050
(5/69)

UNITED STATES PATENT OFFICE
CERTIFICATE OF CORRECTION

Patent No. 3,520,972          Dated July 21, 1970

Inventor(s) Sidney B. Smith, Kevin J. O'Reilly, John Prydie

It is certified that error appears in the above-identified patent and that said Letters Patent are hereby corrected as shown below:

In the Abstract of the Disclosure, line 2, change "strains" to "strain"; delete the remainder of the line and substitute therefor --of a feline virus, which comprises passaging a--.

SIGNED AND SEALED
NOV 10 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,520,972          Dated  July 21, 1970

Inventor(s) Sidney E. Smith, Kevin J. O'Reilly, John Prydie

It is certified that error appears in the above-identified patent and that said Letters Patent are hereby corrected as shown below:

Claim 1, subparagraph (a), last phrase, delete "and tests indicate the diploid cell strain cultures so obtained are free from contaminating micro-organisms"; claim 1, subparagraph (c), line 30, after "immunogenicity" insert --and tests indicate the diploid cell strain cultures so obtained are free from contaminating micro-organisms--.

Signed and sealed this 13th day of March 1973.

(SEAL)
Attest:

EDWARD M. FLETCHER, JR.
Attesting Officer

ROBERT GOTTSCHALK
Commissioner of Patents